United States Patent [19]

Hsieh et al.

[11] Patent Number: 4,933,777
[45] Date of Patent: Jun. 12, 1990

[54] METHOD OF REAL-TIME CONVERTING ANALOG VIDEO SIGNAL TO DIGITAL HALF-TONE DATA AND CONVERTERS THEREOF

[75] Inventors: Robert C. Hsieh, Los Angeles, Calif.; Eric Chen, Hsinchu, Taiwan

[73] Assignee: Microtek Lab., Inc., Torrance, Calif.

[21] Appl. No.: 343,542

[22] Filed: Apr. 26, 1989

[51] Int. Cl.$^5$ .............................................. H04H 1/40
[52] U.S. Cl. .................................... 358/456; 358/457; 358/461
[58] Field of Search ............... 358/456, 458, 455, 457, 358/461, 479, 298; 382/54

[56] References Cited

U.S. PATENT DOCUMENTS 4,783,838 11/1989 Matsunawa ......................... 358/457
4,803,558 2/1989 Hiratsuka et al. .................. 358/457
4,823,189 4/1989 Haines et al. ....................... 358/457

Primary Examiner—Edward L. Coles, Sr.
Attorney, Agent, or Firm—Pennie & Edmonds

[57] ABSTRACT

The present invention relates to a method enabling real-time conversion of the analog video signals from a charge coupled element into digital half-tone data which can be printed on a printer or displayed on a display screen and to a converting device which is developed for use with such method.

The method according to the present invention serves six primary functions as follows:

1. realization of half-tone patterns and regeneration of gray scales;
2. half-tone models of high compression ratio;
3. method for controlling and adjusting the contrast and brightness;
4. half-tone rules for proportional reduction and enlargement;
5. direct current regeneration of analog video signals; and
6. compensation for uneven illumination.

In addition, the present invention provides three embodiments of converter which are adequate to serve the above-mentioned functions in which:

The first embodiment uses a framework comprising an analog comparator;

The second embodiment uses a framework comprising a flash type analog/digital converter and a digital comparator; and The third embodiment uses a framework comprising a successive approaching register (SAR) type analog/-digital converter, a normalized table look-up unit, and a digital comparator.

17 Claims, 14 Drawing Sheets

METHOD OF REAL-TIME CONVERTING ANALOG VIDEO SIGNAL TO DIGITAL HALF-TONE DATA AND CONVERTERS THEREOF

BACKGROUND OF THE INVENTION

The present invention relates to a method which enables real-time conversion of analog video signals into digital half-tone data and the converters thereof.

In general, the method of displaying pattern in a computer printer or on a display screen is of the type of dot correspondence. That is, the pattern is merely expressed by a combination of black dots, while the signal produced by an image sensor is an analog one. Therefore, prior to storage, the gray scale of each dot should be converted to a digital data through an analog/digital converter. When in use, the digital data of each dot is taken one by one for converting to a dot corresponding data according to a computer program. Then, the dot corresponding data is transferred to the printer or the display screen for displaying the pattern.

For a size A4 picture document having a resolution of 300 dots per inch with each dot represented by 8 bits (which can be divided into 256 orders of brightness and darkness), a total of 8 million bytes will be required to store a whole page of such a picture document. With the currently most popular AT version of person computers (PC/AT), it will require more than one hour to complete the converting operation. Such software operating speed can hardly meet the requirements for office automation.

SUMMARY OF THE INVENTION

An object of the invention is to solve the above-mentioned problems with the conventional techniques by providing a method which permits real-time conversion of analog video signals into digital half-tone data and the converters thereof. 10 Another object of the invention is to provide a method which permits real-time conversion of analog video signals into digital half-tone data, and the model values for the half-tone patter and its arrangement and sequence combination used in the converters thereof.

Another object of the invention is to provide a method which permits real-time conversion of analog video signals into digital half-tone data and the converters thereof which have high compression ratio half-tone patterns for substantially reducing the storage space of the half-tone patterns.

Another object of the invention is to provide a method which permits real-time conversion of analog video signals into digital half-tone data and the converters thereof which permits improved control over the contrast and brightness.

Another object of the invention is to provide a method which permits real-time conversion of analog video signals into digital half-tone data and the converters thereof which permits improved results of proportional reduction and enlargement.

Another object of the invention is to provide a method which permits real-time conversion of analog video signals into digital half-tone data and the converters thereof which has the function for direct current regeneration of analog video signals.

Still another object of the invention is to provide a method which permits real-time conversion of analog video signals into digital half-tone data and the converters thereof which improves the uneven brightness.

The other objects of the present invention can be better understood with reference to the accompanying drawings which are given by way of examples only without limiting the scope of the present invention.

BRIEF DESCRIPTION OF THE DRAWINGS

Picture 1 shows the configuration distorted image obtained from a typical commercial fax receiver.

Picture 2 shows the image obtained by means of the 8*8 order half-tone digital process according to the present invention.

Picture 3 shows the half-tone picture in the form of horizontal stripes through high ratio compression according to the present invention.

Figures 1, 2:
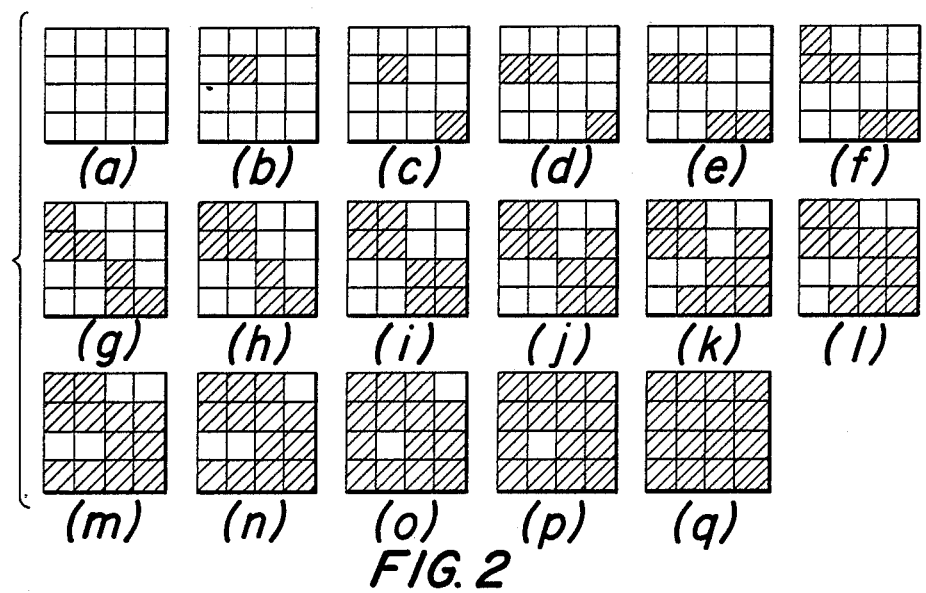
Figure 1A:
Figure 1B:
Figure 1C:

FIG. 1 shows one of the 4*4 half-tone models.

Figure 11:
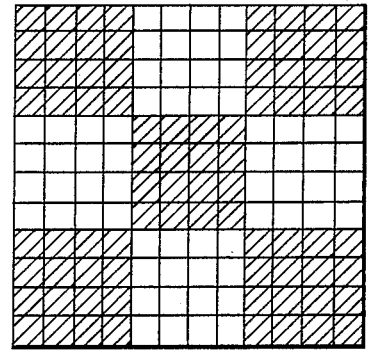

FIGS. 2a—a show the 17 combinations obtained from the 4*4 half-tone model of FIG. 11.

Figure 3:
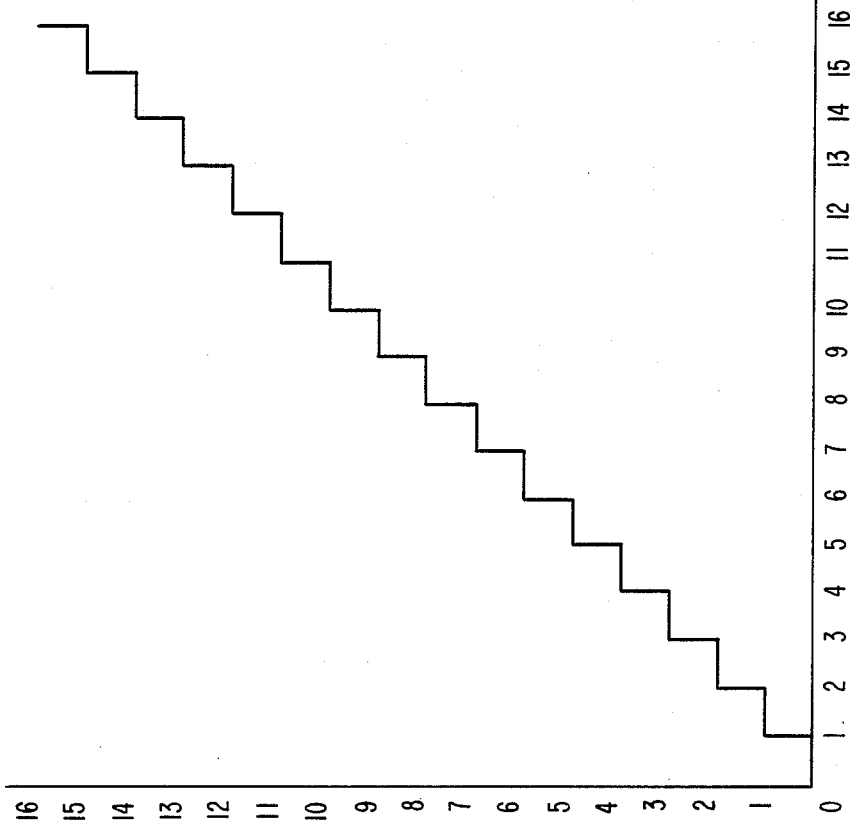

FIG. 3 shows the conversion curve for analog video signals vs digital half-tone signals.

Figures 4, 5:
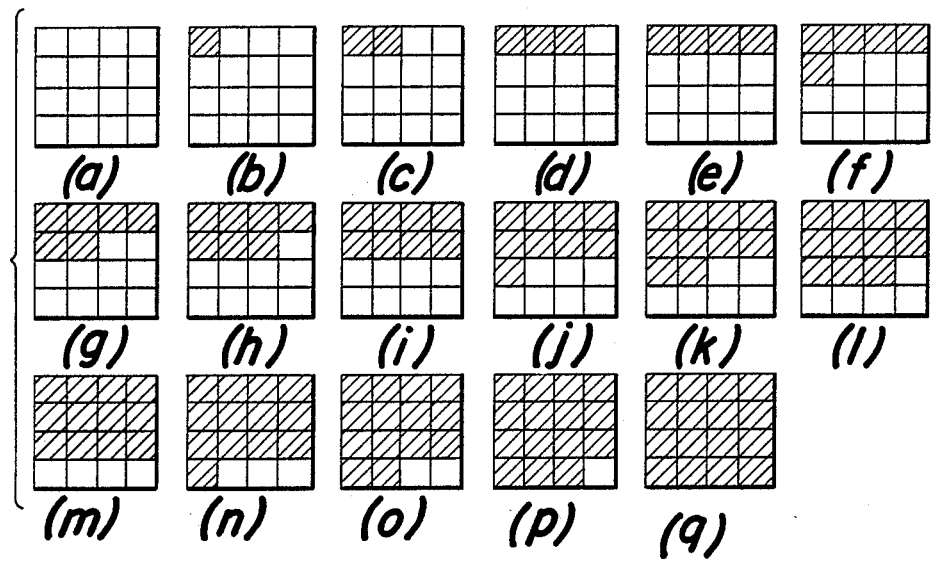

FIG. 4 shows the model of a half-tone pattern in the form of 4*4 order horizontal stripes according to the present invention.

FIGS. 5a—a show the 17 combinations of the model in FIG. 1.

Figure 6:
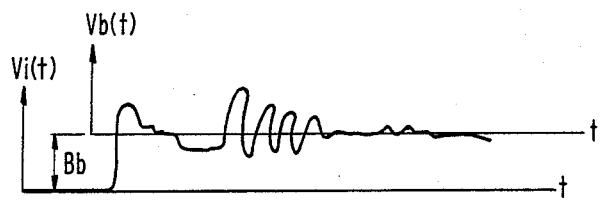

FIG. 6 is a diagrammatic representation showing the brightness and contrast levels of the analog video signals.

Figure 7:
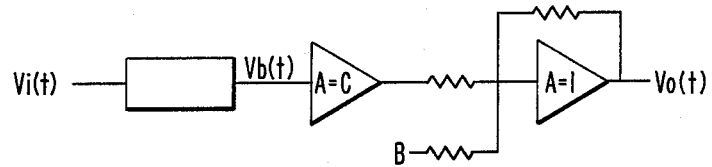

FIG. 7 is a block diagram showing analog processing of brightness and contrast.

Figure 8:
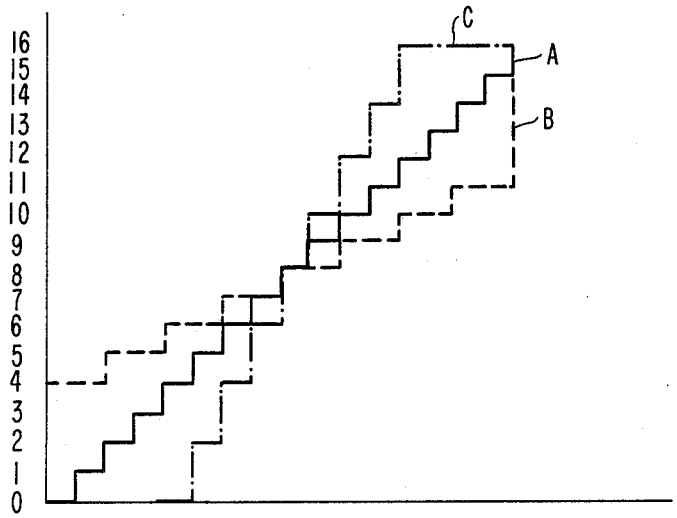

FIG. 8 shows the curves as appeared in case of different brightness and contrast.

Figure 9:
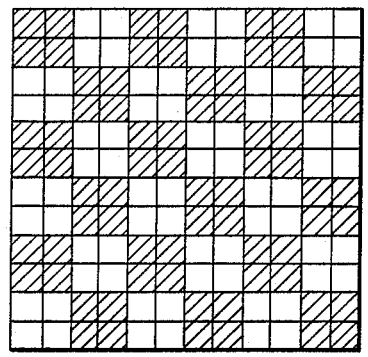

FIG. 9 shows an example of gray scale obtained by first having the sample reduced or enlarged and then being half-tone processed.

Figure 10:
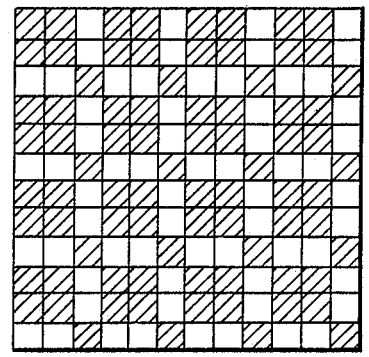

FIG. 10 shows another example of grey order obtained by first being half-tone processed and then sampled on the scale of ¾.

FIG. 11 shows still another example of gray scale obtained by first being half-tone processed and then scaled up to double size.

Figure 12:
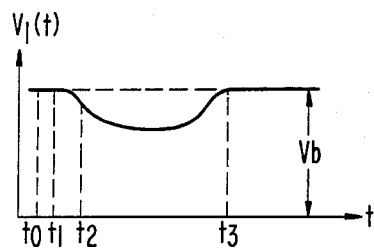

FIG. 12 shows the uneven response to the signals from a typical optical coupled element.

Figure 13:
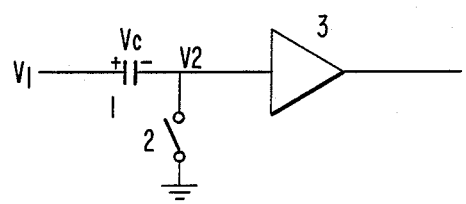

FIG. 13 shows the manner in which the DC component is removed from the analog video signals according to the present invention.

Figure 14:
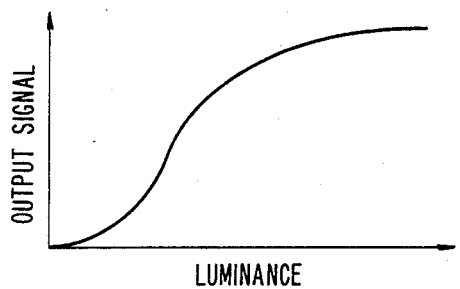

FIG. 14 shows the relationship between the output of the charge coupled element and the illumination.

Figure 15:
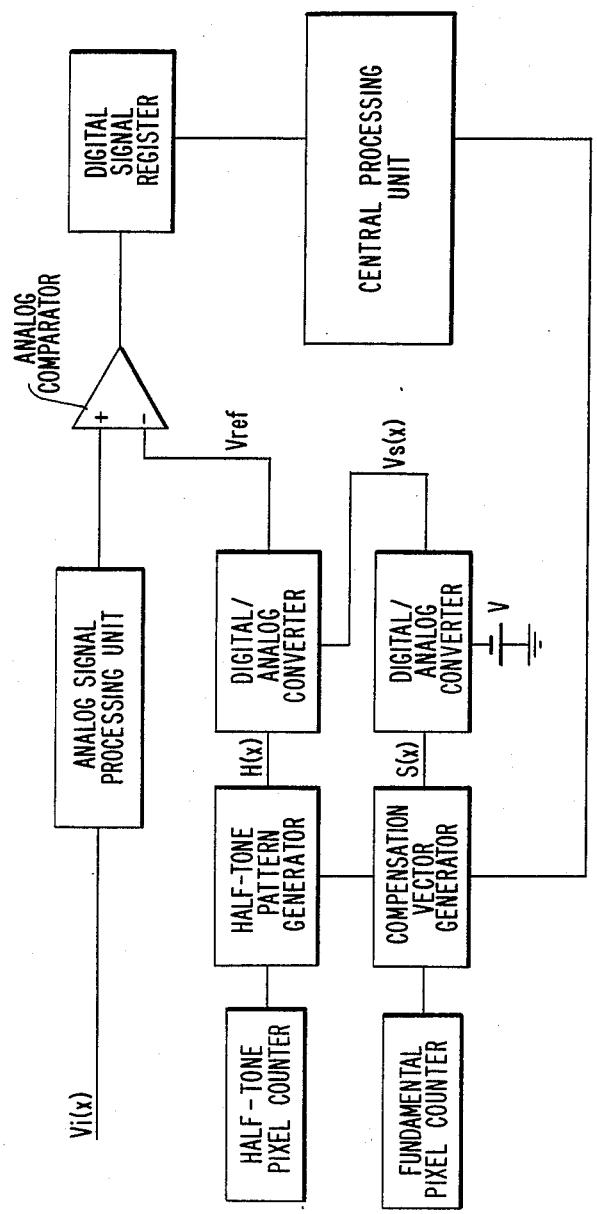

FIG. 15 shows the hardware framework of a first embodiment of the present invention.

Figure 16:
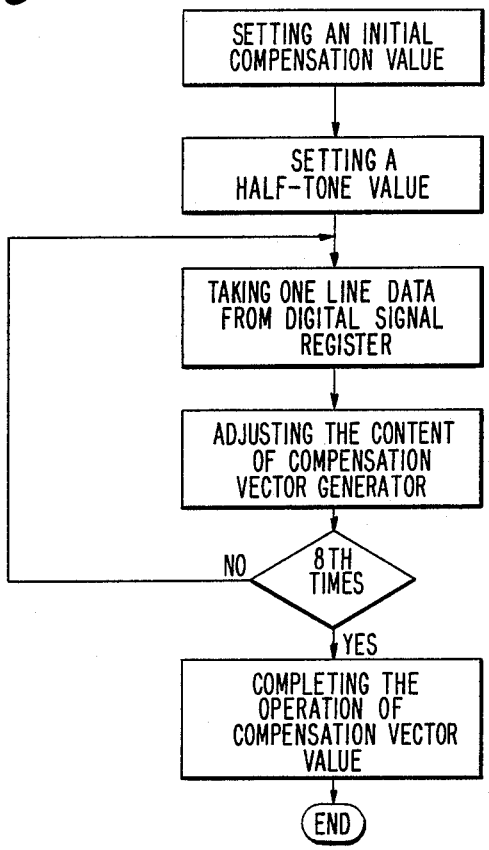

FIG. 16 is a flow chart showing the generation of the compensation vector values in the first embodiment of the present invention.

Figure 17:
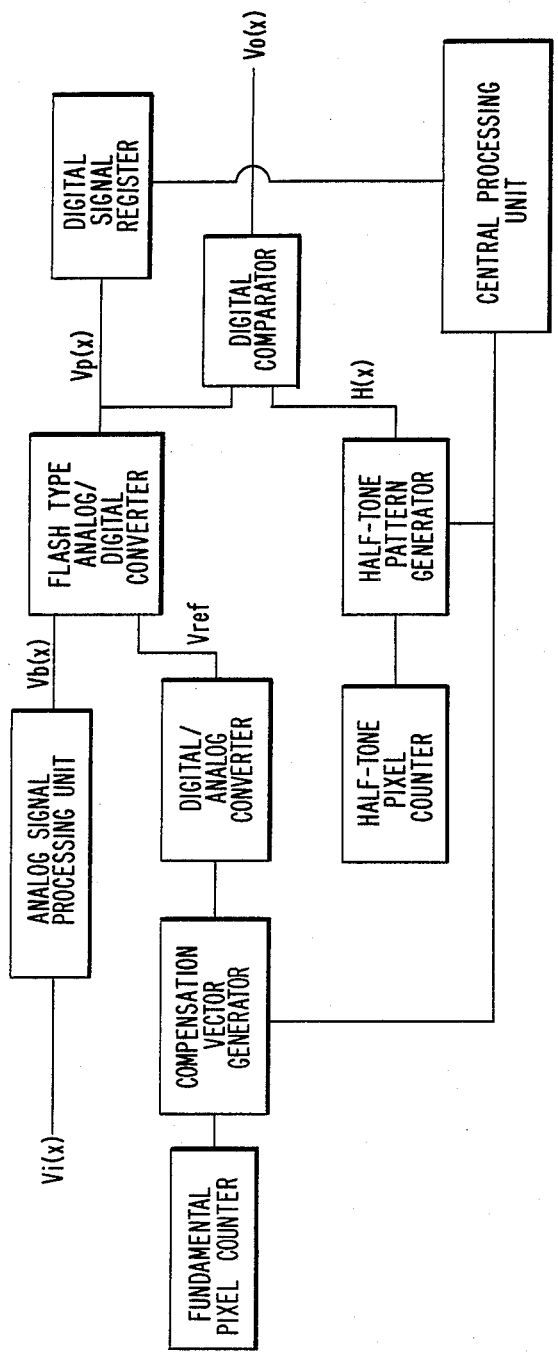

FIG. 17 shows the hardware framework of a second embodiment of the present invention.

Figure 18:
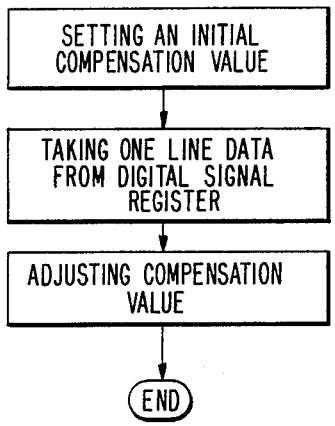

FIG. 18 is a flow chart showing the generation of the compensation vector values in the second embodiment of the present invention.

Figure 19:
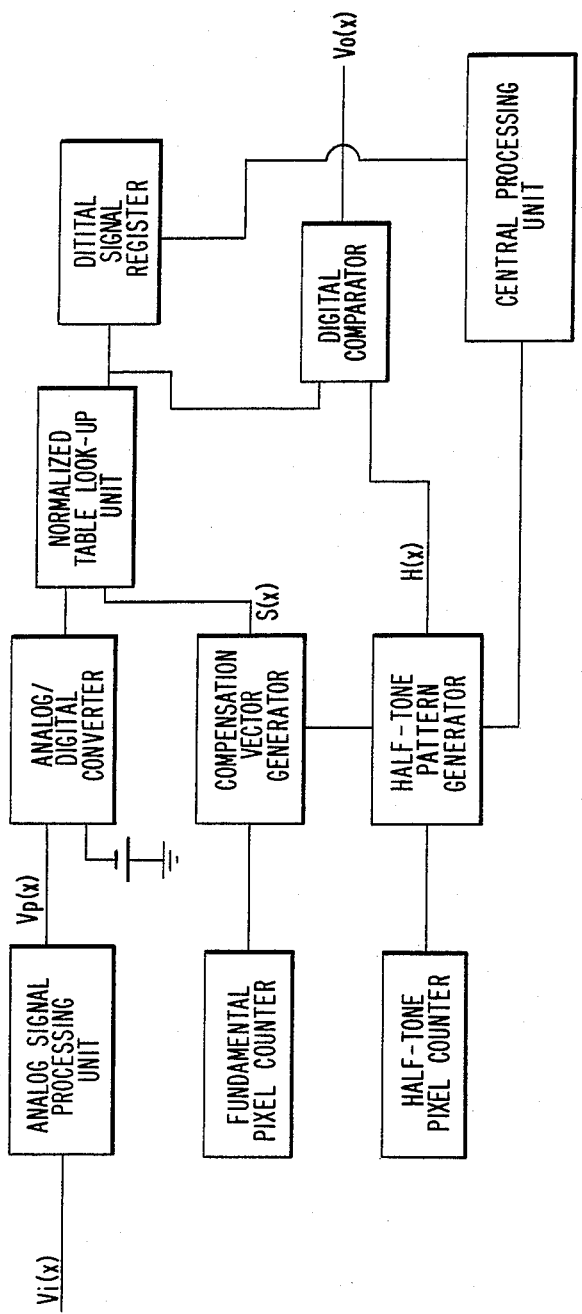
Figure 21:
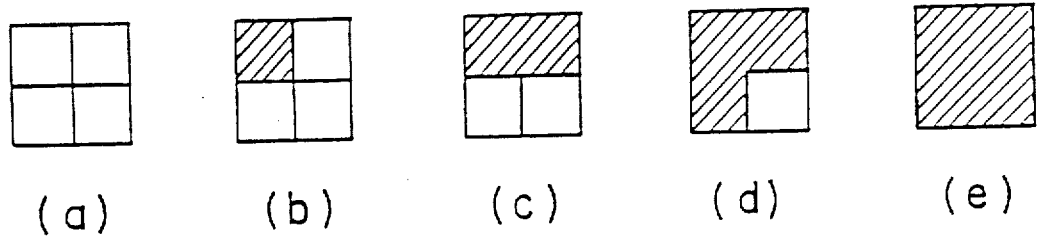

FIG. 19 shows the hardware framework of a third embodiment of the present invention.

FIGS. 20(a)-(n) show realization of various half-tone patterns and gray scale regeneration models.

FIGS. 21(a)-(e) show an example of generated particles showing the half-tone effect.

DETAILED DESCRIPTION OF THE INVENTION

The features and framework of the method for real-time conversion of analog video signals to digital half-tone data and the converters of the present invention will now be described in greater detail with reference to the accompanying drawings.

1. Realization of half-tone patterns and regeneration of gray scales: The digital half-tone image referred to herein is represented by the matrix Gij of M×N, wherein $1 \leq i \leq M$, $1 \leq j \leq N$, i, j being integral numbers; Gij having the value of either "1" or "0", representing a black or a white dot of the image, respectively. Gij is known as the pixel. For an image in the size of A4 having a resolution of 300 dots per inch, a total of 2550*3300 pixels are required for storing such an image. Since Gij has the value of either "1" or "0", in other words, in case a picture is to be presented on a printer or a display screen with the desire result of different gray scales, it must be achieved with dots in corresponding relation therewith by means of the half-tone technique. That is, the density of the dot distribution will be used to indicate the different gray scales. If a picture original containing different gray scales is to be reproduced on a printer or a display screen, a relationship of increasing function must exists between the density of the black dots and the degree of the gray scales, which is the essential of the half-tone models. For an area comprising 4 pixels both longitudinally and laterally (as shown in FIG. 1), if the figure in each pixel indicates the sequence in which the black dots are increased, a total of 17 combinations of different black dot densities as represented by a–q in FIG. 2 will be obtained, that is, there will be 17 different gray scales. Similarly, for an area of m*n, m*n+1 different gray scales will obtained. Since the area of an individual pixel is extremely small, what appears to the human eyes is an overall integral effect such that the different shades of darkness of a picture can be exhibited by means of the half-tone effect. For an area of m*n, the effect resulted from the different sequences of black dot increasement will be sensed by the human eyes as different "stripes".

From the description in connection with FIGS. 1 and 2, a conversion curve of analog video signals to half-tone signals can be obtained. FIG. 3, for example, shows an increasing function relationship. M×N+1 degrees of gray scales can be obtained from the above-mentioned M×N area (defined as a particle) such that the following relationship can be derived:

number of degrees of gray scales α magnitude of particles (in proportion to)

In other words, when the digital half-tone technique is used for gray scale effect, the bigger the particle is, the more there are the degrees of gray scales and, correspondingly, the coarser the picture is. If pictures of fine quality are desired, they can be obtained only at the expense of the degrees of gray scales. The experiments by the applicant have shown that the human eyes can distinguish among some 50 degrees of gray scales so that it is most preferable to take 8*8 scales. The half-tone used in the typical commercial fax units is of 4*4 scales, which has proved to be inadequate for displaying the vast variety of gray scale changes. In addition, the differences between gray scales are so great that pictures such as a bust photos are easily subject to distortion in configuration (as shown in Picture 1). In the present invention, 2×2 to 8*8 scale processings have been used. Their model values and combinations of sequences and arrangements are shown in FIG. 20. The results thus obtained are shown in Picture 2, which are far better than the effect than that can be obtained in conventional manners.

2. Half-tone patterns of high compression ratio: For a size A4 document having a resolution of 300 dots per inch, a memory space of 300*300*8.5*11 or 8 million bits (i.e., 1 million bytes) will be occupied. It is extremely uneconomical for file storage in the current state of art when high capacity memory devices have not yet become popular. The methods for compressing files as defined in CCITT are feasible. The essentials of such methods are based on the fact that successive black or white dots are represented in coded forms. For example, if a series of 1000 black dots which originally would take a memory space of 125 bytes are represented with simple codes of 2–3 bytes, up to 40–60 times of memory space might have been saved. Such methods are more effective for patterns or characters because that their contents have low rate of black and white changes. Said methods, however, are not quite appropriate for digital half-tone files. It can be seen from the gray scale picture of FIG. 2 resulted from the digital half-tone patterns as shown in Picture 1, take (i) of FIG. 2 for example, the black and white changes have a cycle of 2 pixels, if it is stored in coded form, it must be represented by codes of 2–3 bytes. Consequently, the stored data will be increased by using compressed codes and memory space will thus be wasted.

One of the features of the present invention is to provide a half-tone pattern in the form of horizontal stripes. As shown in FIG. 4, after being compressed, the amount of data will be substantially reduced, the sequence of black dot increasement will be in the horizontal direction. As shown in FIG. 5, there are 17 different combinations of black dot densities (i.e., 17 degrees of gray scales). Picture 3 shows the effect for the picture obtained by means of this type of 8*8 scale process. As to the effect of compression, take the pattern in (i) for example, in the extreme cases, if the whole picture is all in this pattern, the black dots will have a cycle of 8.5*300 pixels and the white dots will have the same cycle, so that the compression ratio will be far greater than that resulted from FIG. 2. This, of course, is to take into consideration the extreme cases. The compression ratio of FIG. 5 would be still better even if the estimation is made through the statistical approach. The table below is a comparison of the data amounts before and after compression of the same input document after half-tone processing in connection with FIGS. 2 and 5:

| Half-tone mode of original picture | Original data amount (bytes) | Data amount after compression (bytes) | Compression ratio |
| --- | --- | --- | --- |
| FIG. 2 | 841343 | 414680 | 2.03:1 |
| FIG. 5 | 841343 | 186511 | 4.51:1 | wherein the image pattern resulted from the half-tone mode of FIG. 2 is shown in Picture 2 and that resulted from the half-tone mode of FIG. 5 is shown in Picture 3.

3. Control and adjustment of contrast and brightness: For analog displaying devices (such as a TV screen), the brightness and contrast are defined briefly as follows: Referring to FIG. 6, for analog video signals, brightness is defined as the average signal difference relative to the DC reference orders and the contrast is defined as the amplitude of the signal. If expressed with a mathematical formula, assuming an analog video signal to be Vi (t), then, $$Vi(t) = Vb(t) + Bb$$

wherein Vb (t) is the AC component, Bb is the DC component; the signal after brightness and contrast adjustment is that $$Vo(t) = B + C[Vi(t) - Bb] = CVb(t) + B$$

In brief, contrast is the gain with respect to the AC signal while the brightness is the amount of compensation with respect to the DC signal. In principle, analog processing of brightness and contrast can be represented by the block diagram as shown in FIG. 7. However, as commonly known to those skilled in the art, there are inconveniences when processing the brightness and the contrast of the analog signals, such as the regeneration of the DC components, the accuracy of the signals, the accuracy of the operational amplifiers, etc. Therefore, instead of using the analog process, the present invention provides a digital control process for realization of the brightness and contrast in the half-tone pattern.

FIG. 8 shows the conversion curve of the analog video signal into the half-tone signal, the analog signal being divided into 16 gray scales along the abscissa which, if the brightness control and the contrast gain are not under consideration, then, B=0 and C=1, are correspondingly relative to the half-tone signal shown on the ordinate as indicated by the conversion curve A. If parameters A and B are taken into consideration with the analog signal on the abscissa being still divided into 16 equal parts, each part will not be correspondingly relative to the half-tone signal on the ordinate such as shown by the curve B when B=4, C=½. In other words, after brightness and contrast control, the conversion curve remains to be in stepped form, but the slop and the intercept will not be the same as the original curve. The greatest advantage of contrast and brightness control in the half-tone pattern by means of numerical formula is that it is necessary only to change the content represented by each of the 16 sequence number in half-tone pattern as shown FIG. 1 without having the concern about the problem of instable analog signal processing resulted from changes in the electronic parts and operating circumstances.

4. Half-tone rules for proportional reduction and enlargement: For an input having the resolution of 300 dots per inch, if the selected output device (such as a laser printer) has the same resolution of 300 per inch, the the output document will be of the same size as the input original; if the input is selected to be in the resolution range of 150 dots per inch, the size of the output document will be one half of the original dimensions on the abscissa and the ordinate, respectively; and, if sampling dots are increased to 600 dots per inch during input operation, the document printed out will be enlarged to double the size along the abscissa so that when the digital half-tone signals are processed, it is important that an adjustment be made before and after the sampling and the half-tone processing, otherwise the picture produced will be extremely coarse. Take the gray scale (i) resulted from the above-mentioned FIG. 1, for example, if the half-tone processing is effected after the sampling (taking ¾), the result will be as shown in FIG. 9, which is of the same size as before reduction; if the half-tone processing is carried out before the sampling operation, distortion might have already existed as shown in FIG. 10. Now if a double enlargement is made before the half-tone processing, the result will remain as shown in FIG. 9; if the half-tone processing is carried out first and then the double enlargement, the coarseness might have been appeared as shown in FIG. 11. Consequently, if the sampling and the half-tone processing are carried out in the wrong sequence, there might have the results of distortion as shown in FIG. 10 or coarseness as shown in FIG. 11. Therefore, in the present invention, proportional reduction or enlargement is carried out before the half-tone processing so as to retain the gray degrees for improved enlarging or reducing effects.

5. DC reconstruction of the analog video signals: As shown in FIG. 14, the magnitude of the output signal from the charge coupled element is in increasing functional relation with the illumination but DC component is still contained therein as shown in FIG. 12. FIG. 12 shows a uniform gray line as "seen" by a typical optical coupled element. The unevenness is caused by the light source or the lens itself. The DC component of Vb in the signal must be removed by way of a DC reconstruction circuit as shown in FIG. 13, said circuit comprising a capacitor (1), an analog switch (2) and an operational amplifier (3). In FIG. 12, during the period t2—t3 when signal changes are present, the analog switch (2) is in open condition, so that V1 and V2 have the relation of V1=V2+Vc; during the period t0—t1, the analog switch (2) is in closed condition, the capacitor (1) will be charged to Vb, that is, V0=Vb, hence during the period t2—t3, V2=V1−Vb, the DC component can thus be eliminated. The design of the analog switch (2) being selected to be in closed condition during t0—t1 is for purpose of properly using the typical linear charge coupled element that will retain some dark areas on both edges in which the output signal have not been subject to illumination so that its value is Vb. The operational amplifier (3) requires that the input impedance be very high such that the charging constant of the capacitor (1) will be determined simply by its capacitance and the internal resistance of the analog switch.

6. Compensation for illumination unevenness: The magnitude of the output signal from the charge coupled element is in direct increasing functional relation with the light intensity illuminated on said element as shown in FIG. 14. The light illuminated on said charge coupled element is emitted from the light source, the light being first illuminated to the document body under scanning and then reflected therefrom. If the light emitted from the light source is uneven, then the light reflected to the charge coupled element remains to be uneven, although the image on the document is of the same gray scale. Such unevenness, if not compensated, will certainly result in errors and the unevenness of the light source, in turn, will remain. If, for example, a fluorescent lamp is used as the light source, the central portion of the tubular lamp must brighter than both ends thereof; if a series of halogen lamps are used, the brightness at the portions corresponding to individual lamps will be higher than at the portions between the lamps. In addition, because optical lens is used for focusing, such lens being thick in the central portion and thin around the edge, the cosine factor together with the refraction effect will result in unevenness which can be compensated through the standard approach. In the present invention, there is provided a standard plate of even gray scale such that prior to scanning, the light source illuminates said plate and then is reflected to the light coupled element whereby a digital circuit can record the combined data of the light source and lens unevenness which can be used as the correction standard for compensating the errors resulted during actual scanning thereafter.

EMBODIMENTS

To accomplish the real-time processing of the above six features, the present invention provides the following three embodiments. The scope of the present invention, however, is not limited to such embodiments.

The first embodiment: This embodiment uses the framework of an analog comparator (as shown in FIG. 15) wherein in the half-tone pattern generator a central processing unit is used to process in advance three pre-stored processing vectors of (1) "half-tone pattern realization and gray scale regenerated half-tone model", (2) half-tone model of high compression ratio, and (3) modulated adjustment model of contrast and brightness, to produce usable digital half-tone signals through the real-time processing by the hardware. In the analog signal processing unit, the DC regeneration of the analog video signal $Vi(x)$ is processed and proportionally reduced or enlarged sampling of the image prior to half-tone processing is carried out in advance. Compensation vector is stored in the compensation vector generator for the main purpose of compensating the errors due to the uneven illumination of the light source, the compensation vector being obtained according to an automatic correction program in connection with the operation of said hardware framework. The flow chart is shown in FIG. 16. The first step is to set an initial compensation value such as 80H. The second step is to set a half-tone value such as FFH. Then a signal of $\frac{1}{2}$ V will be obtained at the inverted input terminal of the analog comparator in FIG. 15. The result of the comparison between said signal and the output signal $Vb(x)$ from the analog signal processing unit will be stored in a digital signal register. In the third step, a ratio (1 or 0) of the input signal $Vb(x)$ is obtained when the compensation vector is set, thereby to determine the direction in which the compensation vector is adjusted. In the fourth step, the relative position is adjusted according to the result from the third step. If the result is 1, 10H, for example, will be added, otherwise, 40H, for example, will be added.

After this operation, a new compensation vector will be obtained which will be compared again with $Vb(x)$, then the compensation vector will be readjusted according to the result thereof (which is stored in the digital signal register). After several (up to eight) repeated operations, then the compensation vector follows that $S(X) = Vb(X)$. The mechanism is designed to have a standard plate of even gray scale for correction provided at the starting point of scanning, the light reflected therefrom being sensed by the charge coupled element such that after the automatic correcting operation, the contents of the compensation vector generator has been recorded as the correction reference to the changes in $Vi(X)$ (actual scanning of the (document).

In executing the automatic correction program, the half-tone value $H(X)$ is fixed at the value of FFH. When the document signals are actually processed, if output of black and white tone is desired, then the value for $H(X)$ is set to be, for example, 80H and then it is $\frac{1}{2}$ $Vp(X)$ at the inverted phase terminal of the analog comparator. Effect of different threshold settings can be obtained by adjusting the value of $H(X)$. If half-tone output effect is desired, a two-dimensional cycle function must be selected for $H(X)$, the magnitude being 2*2, 3*3, 4*4, ... N*N. The cyclic form of N*N may also be selected.

Now the generation of the half-tone effect will be described taking the form of 2*2 as an example. assuming that the half-tone form present in the half-tone generator may be:

$$H(X) = \begin{matrix} 20H & 60H \\ A0H & E0H \end{matrix}$$

then the reference voltage signal generated at the inverted phase terminal of the analog comparator is:

$$\text{for odd lines: } Vref = \begin{cases} 1/8\ VS(X) & \text{when } X = 1,3,5,\ldots 2N-1 \\ 3/8\ VS(X) & \text{when } X = 2,4,6,\ldots 2N \end{cases}$$

$$\text{for even lines: } Vref = \begin{cases} 5/8\ VS(X) & \text{when } X = 1,3,5,\ldots 2N-1 \\ 7/8\ VS(X) & \text{when } X = 2,4,6,\ldots 2N \end{cases}$$

Therefore, for $0 < Vb(X) < Vb$ (random scanning of document), Vo may generate five different particle as shown in FIGS. 21(a)–(e). This is the so-called half-tone effect. Because the particles are very small, so what sensed by the eyes is the gray scale effect (darker and lighter tones).

As to the contrast and bright adjustment for the 2*2 form of the above example, the bright adjustment formula will be $H(X) = B$, i.e., $$\begin{matrix} 20 + B & 60H + B \\ A0H + B & E0H + B \end{matrix}$$

and the contrast adjustment formula will be $C*H(X)$, i.e., $$\begin{matrix} C*20H & C*60H \\ C*A0H & C*E0H \end{matrix}$$

When contrast and brightness are processed together, the formula will wb $C*H(X) + B$, i.e., $$\begin{matrix} C*20H + B & C*60H + B \\ C*A0H + B & C*E0H + B \end{matrix}$$

The second embodiment: The second embodiment uses a framework comprising a flash type analog/digital converter and a digital comparator (as shown in FIG. 17). In this framework, after the digit-to-analog conversion, the compensation vector is fed to the reference signal terminal (Vref) of the flash type analog/digital converter to be compared with the signal Vb (X) which has been processed by the analog signal processing unit. The output Vp (X) are normalized digital signals which, then, are compared in digital comparator with H (X) generated by the half-tone pattern generator. The result thus obtained Vo (X) is the black-and white tone or half-tone output. As to the procedure in which the compensation vector is obtained, since the analog-digital generator is used, the first embodiment is simplified and the flow chart is shown in FIG. 18. In the first step, an initial compensation value is set and then the output from the digital/analog converter is Vb. The line data obtained in the second step is the compensation vector. In the third step, the compensation vector obtained in the second step is transferred into the compensation signal generator thus to complete the automatic correction procedure. All the other functions such as contrast and brightness adjustment, generation of the black-and-white tone and the half-tone are the same as those in the first embodiment.

The third embodiment: The third embodiment uses a framework comprising a succesive approaching register (SAR) type analog/digital converter, a normalized table look-up unit and a digital comparator (as shown in FIG. 19). Since the reference voltage Vref must not be changed when the SAR type analog-digital converter is used, it is necessary to use the normalized table look-up unit. Assuming that the half-tone value being FFH, then $$Vn(X) = \frac{Vb(X)}{S(X)} \cdot FFH$$

The other automatic correction program flow as well as the contrast and brightness adjustment, and the generation of the black-and-white tone and the half-tone are the same as the second embodiment.

THE EFFICACY OF THE INVENTION

By means of the above technique, the present invention uses the method of real-time conversion instead of the operation of the conventional program to obtain the real-time effect. Following is a comparison:

|  | Scanning Time per Line | Processing Time per Line | Total Time per Page |
|---|---|---|---|
| Operation by Conventional Program | T1 | T2 | N (T1 + T2) |
| Processing with Real-time Hardware | T1 | 0 | NT1 |

N: Total lines per page;
T1 << T2

While the invention has been described and illustrated in detail, It is clearly to be understood that this is intended by way of illustration and example only and is not to be taken by way of limitation, the spirit and scope of the invention being limited only by the terms of the following claims.

We claim:
1. A real-time converter for converting an analog video signal to a digital half-tone signal, comprising:
   an analog signal processing unit for proportionally reduced or enlarged sampling of the image which has been half-tone processed in advance from the analog output signal generated by a charge coupled element, and for DC regeneration of the analog video signal;
   a central processing unit;
   a half-tone pixel counter;
   a half-tone pattern generator in which three processing vectors, i.e., the half-tone pattern realization and the gray scale regenerated half-tone model, high compression ratio half-tone model, and the contrast and brightness modulated adjustment model, are used to generate the digital half-tone signal which in turn, is used to generate a corresponding half-tone voltage signal through a digital/analog converter;
   a basic pixel counter;
   a compensation vector generator which, in connection with the operation of the basic pixel counter and the central processing unit, generates a compensation vector for compensating the errors of uneven brightness, the compensation value being converted to a corresponding compensation voltage by the digital/analog converter;
   an analog comparator for comparing the input signal and the half-tone value of the analog signal processing unit with the reference potential value of the compensation value; and
   a digital signal register for storing the result from the analog comparator;
   whereby realization of half-tone pattern and gray scale regeneration, high compression ratio half-tone model, DC regeneration of the analog video signal, and compensation for illumination unevenness are obtained.

2. The converter according to claim 1, wherein optimal data compression ratio is obtained for the high compression half-tone model by horizontally encoding the digital half-tone film pattern to obtain half-tone pattern in the form horizontal stripes.

3. The converter according to claim 1, wherein the contrast and brightness control and adjustment is realized directly in the half-tone pattern in the manner of digital control, the conversion curve of the analog video signal vs digital half-tone signal being of a stepped corresponding relationship at the basic brightness and contrast control such that the contrast and brightness can be controlled by changing the slope and the intercept without changing the stepped shape.

4. The converter according to claim 1, wherein the DC regeneration of the analog signal is accomplished by a DC regeneration circuit comprising a capacitor, an analog switch, and an operational amplifier, the analog switch being in open condition during signal changes and in closed condition prior to such changes, such that the DC component in the analog signal can be eliminated during signal changes by charging the capacitor to a certain DC voltage level.

5. The converter according to claim 1, wherein said framework further comprises:
   a flash type analog/digital converter and a digital/analog converter; wherein the output of the half-tone pattern generator is transferred to the digital comparator directly in digital form; and the output of the compensation vector generator is converted to a analog reference voltage by the digital/analog converter and transferred to one input terminal of said flash type analog/digital converter to be compared with the output of the analog signal processing unit; and the digital comparator is used for comparing the outputs of the half-tone pattern generator and the flash type analog/digital converter.

6. The converter according to claim 1 further comprising:
an SAR analog/digital converter, and
a normalized able look-up unit; wherein the analog comparator is substituted with a digital comparator.

7. A method for real-time converting an analog video signal to a digital half-tone signal by using a real-time converter comprising:
an analog signal processing unit for proportionally reduced or enlarged sampling of the image which has been half-tone processed in advance from the analog output signal generated by the charge coupled element, and for DC reconstruction of the analog video signal;
a central processing unit;
a half-tone pixel counter;
a half-tone pattern generator in which three processing vectors, i.e., the half-tone pattern realization and the gray scale regenerated half-tone model, high compression ratio half-tone model, and the contrast and brightness modulated adjustment model, are used to generate the digital half-tone signal which in turn, is used to generate a corresponding half-tone voltage signal through a digital-/analog converter;
a basic pixel counter;
a compensation vector generator which, in connection with the operation of the basic pixel counter and the central processing unit, generates a compensation vector for compensating the errors of uneven brightness, the compensation value being converted to a corresponding compensation voltage by the digital/analog converter;
an analog comparator for comparing the input signal and the half-tone value of the analog signal processing unit with the reference potential value of the compensation value;
a digital signal register for storing the result from the analog comparator; said method comprising the steps of: after being illuminated by a light source, the image of the a document together with the reflected light will sensed by the charge coupled element, the output analog signal, after having been proportionally reduced or enlarged sampling of the image prior to the half-tone processing by the analog signal processing unit, being provided for the half-tone processing and DC reconstruction of the analog signal in the next step, the output from he analog signal processing unit be transferred to an input terminal of the analog comparator and the parameters of the half-tone pattern generator and the compensation vector generator being carried to another input terminal of said analog comparator, the result from the comparison therebetween being output to the digital signal register, thus enabling real-time conversion of the analog video signal output from the charge coupled element to digital half-tone signals that can be printed on a printer or displayed on a display screen.

8. The method according to claim 7, wherein the compensation vector is prestored in the compensation vector generator, the matching mechanism of the central processing unit being designed to have a standard plate of even gray scale for correction purpose, said compensation vector being obtained from said plate executing the automatic correction program operation when light being sensed thereby, an initial compensation value and a half-tone value being first set by the central processing unit while the reference potential input terminal of the analog comparator being at ½ V, this voltage level being compared with the output value of the analog signal processing unit and the result of the comparison being stored in the digital signal register, thereby to determine the increment or decrement value for the compensation vector value, so as to obtain the optimal compensation value which, after repeated operations, will be recorded and used for compensating the errors resulted from the uneven illumination by the light source during document scanning.

9. The method according to claim 8, wherein the initial compensation value is 80H and the half-tone value is FFH.

10. The method according to claim 8 further utilizing a standard plate of even gray scale for correction purpose so as to compensate the uneven illumination on an optical coupled element, before scanning said standard plate be illuminated by light which will then be reflected to the optical coupled element such that the digital circuit may record the combined unevenness data of the light and the lens as the standard for correction.

11. The method according to claim 7 wherein the half-tone value in the half-tone pattern generator is fixed at a first value during execution of the automatic correction program, said half-tone value being set at a second value if black-and-white output being desired, a preset reference voltage signal then being present at one input terminal of the analog comparator such that effect of different threshold settings can be obtained by adjusting the half-tone value, if half-tone output being desired, then a two-dimensional cycle function having to be selected, the magnitude being selected to be in the cyclic form of N*M so as to produce the half-tone having the gray scale effect.

12. The method according to claim 11 wherein the first value of the half-tone values is FFH and the second value thereof is 80H.

13. The method according to claim 11 wherein the model values of the half-tone pattern and the sequence and arrangement thereof are any one of (a)-(n) listed below:

| (a) | | | | | | | | (b) | | | | | | | |
|---|---|---|---|---|---|---|---|---|---|---|---|---|---|---|---|
| 27 | 21 | 13 | 29 | 37 | 43 | 51 | 35 | 1 | 5 | 2 | 6 | 3 | 7 | 4 | 8 |
| 12 | 2 | 4 | 23 | 54 | 64 | 62 | 41 | 9 | 13 | 10 | 14 | 11 | 15 | 12 | 16 |
| 19 | 8 | 6 | 15 | 45 | 58 | 60 | 49 | 17 | 21 | 18 | 22 | 19 | 23 | 20 | 24 |
| 31 | 10 | 17 | 25 | 33 | 56 | 47 | 39 | 25 | 29 | 26 | 30 | 27 | 31 | 28 | 32 |
| 38 | 44 | 52 | 36 | 28 | 22 | 14 | 30 | 33 | 37 | 34 | 38 | 35 | 39 | 36 | 40 |
| 54 | 64 | 62 | 42 | 12 | 2 | 4 | 24 | 41 | 45 | 42 | 46 | 43 | 47 | 44 | 48 |
| 46 | 58 | 60 | 50 | 20 | 8 | 6 | 16 | 49 | 53 | 50 | 54 | 51 | 55 | 52 | 56 |
| 34 | 56 | 48 | 40 | 32 | 10 | 18 | 26 | 57 | 61 | 58 | 62 | 59 | 63 | 60 | 64 |
| (c) | | | | | | | | (d) | | | | | | | |

-continued (e)

| 1 | 9 | 17 | 25 | 33 | 41 | 49 | 57 |
|---|---|----|----|----|----|----|----|
| 5 | 13 | 21 | 29 | 37 | 45 | 53 | 61 |
| 2 | 10 | 18 | 26 | 34 | 42 | 50 | 58 |
| 6 | 14 | 22 | 30 | 38 | 46 | 54 | 62 |
| 3 | 11 | 19 | 27 | 35 | 43 | 51 | 59 |
| 7 | 15 | 23 | 31 | 39 | 47 | 55 | 63 |
| 4 | 12 | 20 | 28 | 36 | 44 | 52 | 60 |
| 8 | 16 | 24 | 32 | 40 | 48 | 56 | 64 |

(f)

| 2 | 34 | 10 | 42 | 4 | 36 | 12 | 44 |
|---|----|----|----|----|----|----|----|
| 50 | 18 | 58 | 26 | 52 | 20 | 60 | 28 |
| 14 | 46 | 6 | 38 | 16 | 48 | 8 | 40 |
| 62 | 30 | 54 | 22 | 64 | 32 | 56 | 24 |
| 4 | 36 | 12 | 44 | 2 | 34 | 10 | 42 |
| 52 | 20 | 60 | 28 | 50 | 18 | 58 | 26 |
| 16 | 48 | 8 | 40 | 14 | 46 | 6 | 38 |
| 64 | 32 | 56 | 24 | 62 | 30 | 54 | 22 |

(g)

| 2 | 11 | 21 | 36 | 30 | 4 |
|---|----|----|----|----|---|
| 15 | 13 | 23 | 25 | 27 | 17 |
| 34 | 32 | 6 | 8 | 10 | 20 |
| 36 | 30 | 4 | 2 | 12 | 22 |
| 26 | 28 | 18 | 16 | 14 | 24 |
| 8 | 9 | 19 | 34 | 32 | 6 |

(h)

| 6 | 8 | 9 | 19 | 33 | 31 |
|---|---|---|----|----|----|
| 4 | 2 | 11 | 21 | 35 | 29 |
| 17 | 15 | 13 | 23 | 25 | 27 |
| 20 | 33 | 31 | 6 | 8 | 10 |
| 22 | 35 | 29 | 4 | 2 | 12 |
| 24 | 26 | 28 | 18 | 16 | 14 |

(i)

| 25 | 10 | 11 | 12 | 13 |
|----|----|----|----|----|
| 24 | 9 | 2 | 3 | 14 |
| 23 | 8 | 1 | 4 | 15 |
| 22 | 7 | 6 | 5 | 16 |
| 21 | 20 | 19 | 18 | 17 |

(j)

| 24 | 20 |
|----|----|
| 15 | 8 |
| 11 | 4 |
| 19 | 7 |
| 23 | 14 |

(k)

| 12 | 16 | 25 |
|----|----|----|
| 5 | 9 | 21 |
| 1 | 2 | 13 |
| 3 | 6 | 17 |
| 10 | 18 | 22 |

(l)

| 7 | 8 | 9 | 10 |
|---|---|---|----|
| 6 | 1 | 2 | 11 |
| 5 | 4 | 3 | 12 |
| 16 | 15 | 14 | 13 |

(m)

| 15 | 11 | 7 | 16 |
|----|----|---|----|
| 6 | 2 | 3 | 12 |
| 10 | 1 | 4 | 8 |
| 14 | 5 | 9 | 13 |

(n)

| 10 | 9 | 7 | 4 |
|----|---|---|---|
| 8 | 6 | 3 | 13 |
| 5 | 2 | 12 | 15 |
| 1 | 11 | 14 | 16 |

| 1 | 6 | 3 | 5 | 7 | 9 | 1 | 3 |
|---|---|---|---|---|---|---|---|
| 9 | 5 | 7 | 8 | 2 | 4 | 4 | 2 |
| 4 | 8 | 2 | 6 | 3 | 1 |   |   |

14. The method according to claim 7 wherein the device further comprises:

a flash type analog/digital converter and a digital-/analog converter; wherein the output of the half-tone pattern generator is transferred to the digital comparator directly in digital form; and the output of the compensation vector generator is converted to a analog reference voltage by the digital/analog converter and transferred to one input terminal of said flash type analog/digital converter to be compared with the output of the analog signal processing unit; and the digital comparator is used for comparing the outputs of the half-tone pattern generator and the flash type analog/digital converter; wherein based on said framework, after the digit-to-analog conversion, the compensation vector is fed to the reference signal terminal of the flash type analog/digital converter, the video signal processed by the analog signal processing unit being normalized and digitalized and then compared with the signal generated by the half-tone pattern generator in the digital comparator, and finally the results from the comparison of the outputs being output as the black-and-white tone or half-tone signal.

15. The method according to claim 14, wherein the compensation vector stored in the compensation vector generator is obtained from the operation executed by the central processing unit; said method further comprising first setting an initial compensation value, then taking the line data in the digital register as the compensation vector and adjusting the compensation value of the compensaton vector generator.

16. The method according to claim 15, where the initial compensation value is set to be FFH.

17. The method according to claim 7 wherein the device further comprises:

an SAR analog/digital converter, and a normalized table look-up unit;

wherein the analog comparator is substituted with a digital comparator;

said method further comprising based on said framework, transferring the output of the analog processing unit to the analog/digital converter to be compared with the fixed reference voltage, the result being transferred to the normalized table look-up unit, the conversion function between the output and the compensation vector generator being $Vn(X) = Vb(X)/S(X) * FFH$, then the output being compared with the signal generated by half-tone pattern generator in the digital comparator with the result from the comparison of the outputs as output of the black-and-white tone or the half-tone signal.

* * * * *

UNITED STATES PATENT AND TRADEMARK OFFICE
CERTIFICATE OF CORRECTION

PATENT NO. : 4,933,777

DATED : June 12, 1990

INVENTOR(S) : Robert C. Hsieh and Eric Chen

It is certified that error appears in the above-identified patent and that said Letters Patent is hereby corrected as shown below:

In the drawings, please add Figs. 21(a) through 21(e) in accordance with the attached drawing.

Signed and Sealed this

Fifteenth Day of October, 1991

Attest:

HARRY F. MANBECK, JR.

*Attesting Officer*    *Commissioner of Patents and Trademarks*